Figure 21:
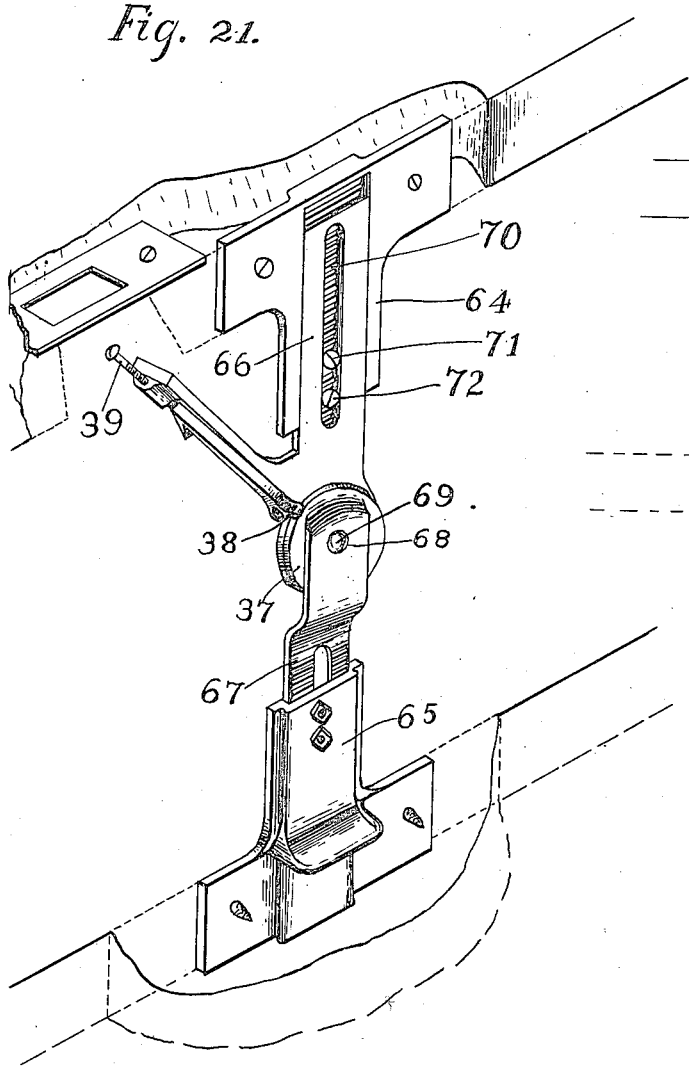

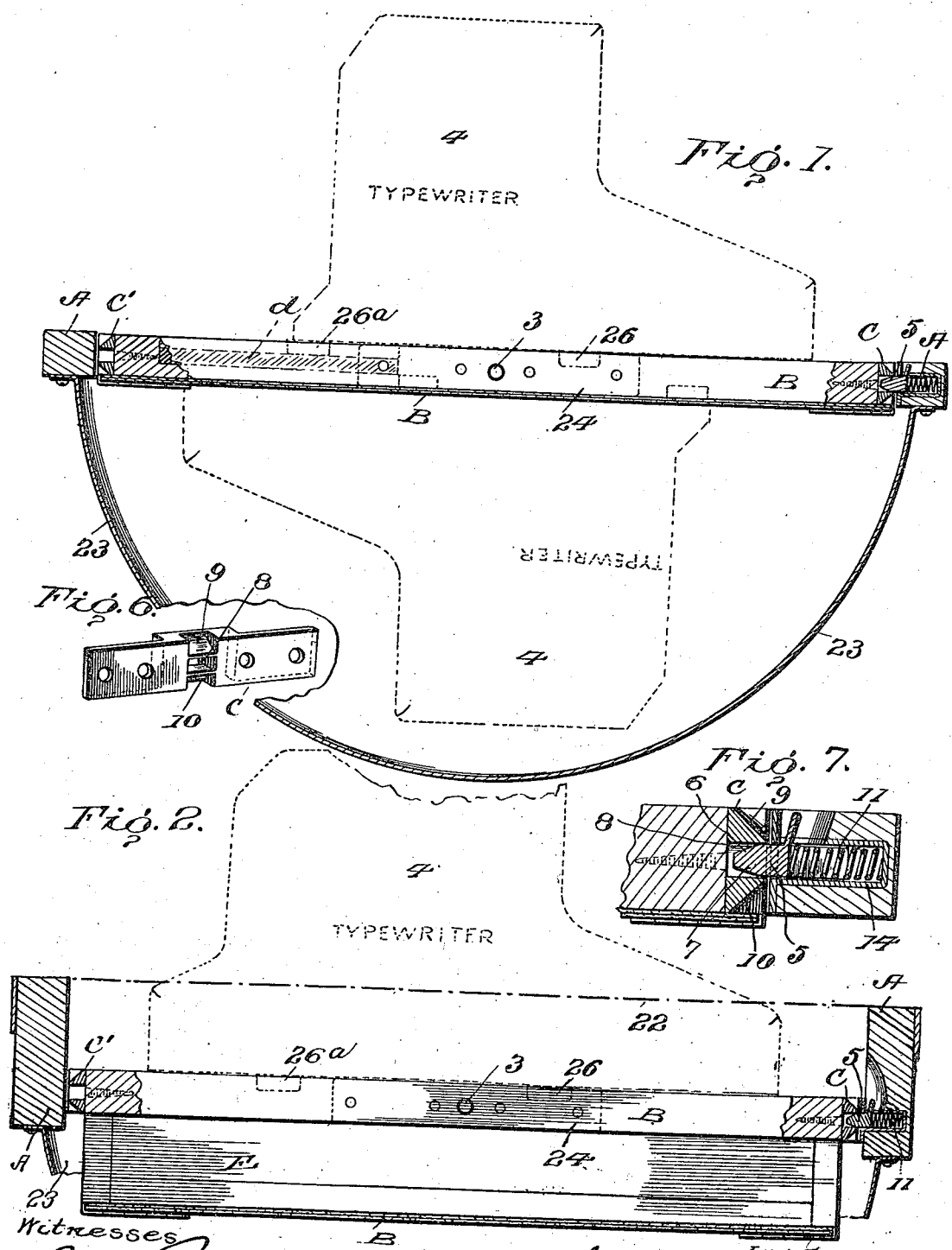

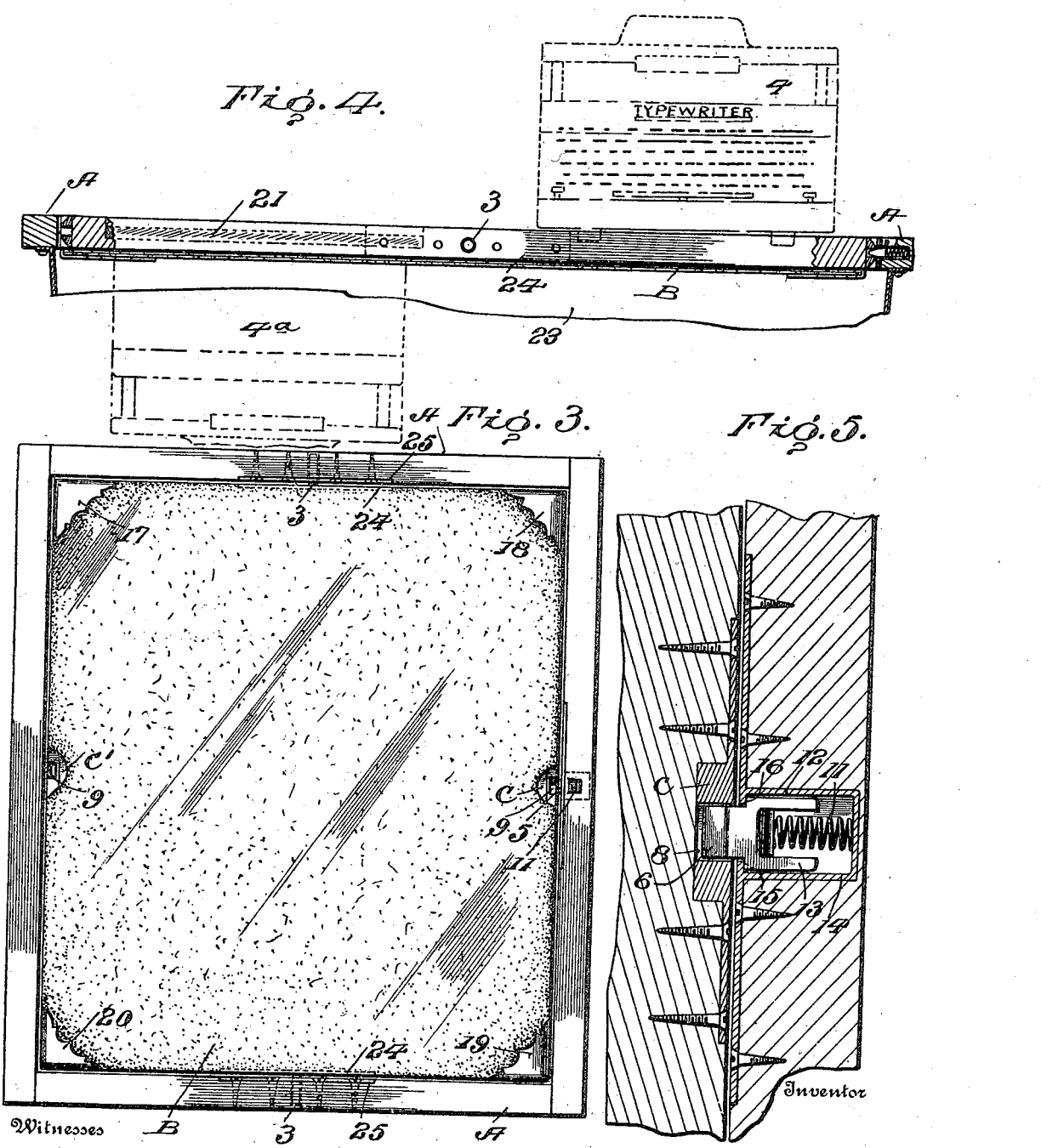

E. BALTZLEY.
TYPE WRITER CABINET.
APPLICATION FILED DEC. 18, 1906. RENEWED FEB. 19, 1910.
961,525.
Patented June 14, 1910.
6 SHEETS—SHEET 3.
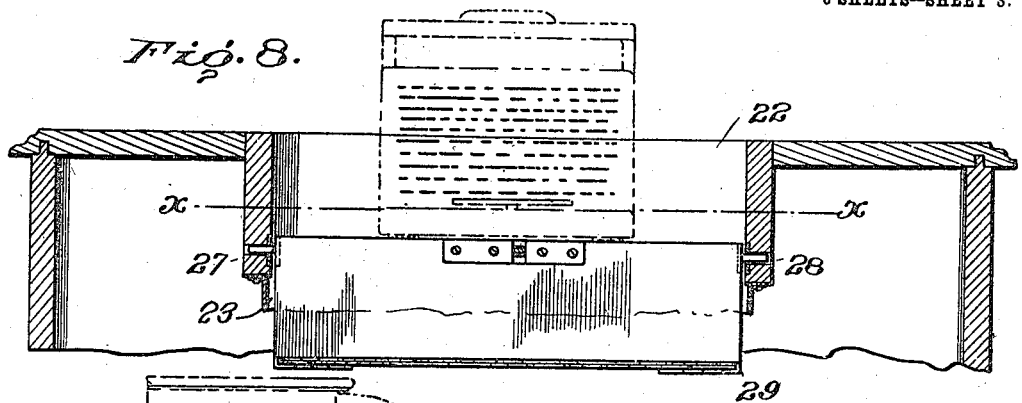
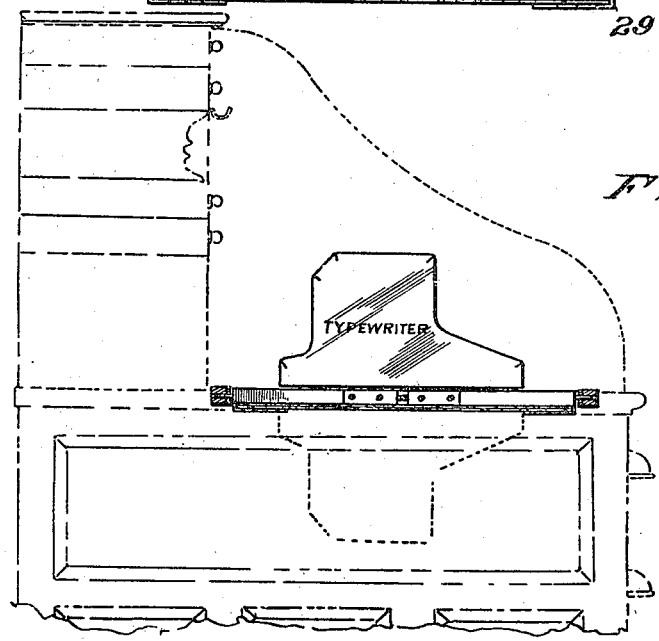
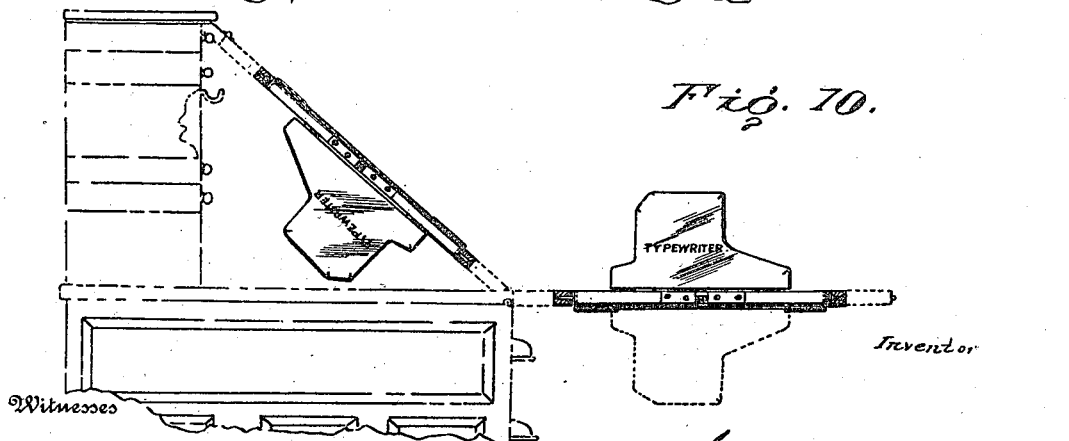

E. BALTZLEY.
TYPE WRITER CABINET.
APPLICATION FILED DEC. 18, 1906. RENEWED FEB. 19, 1910.
961,525.
Patented June 14, 1910.
6 SHEETS—SHEET 4.
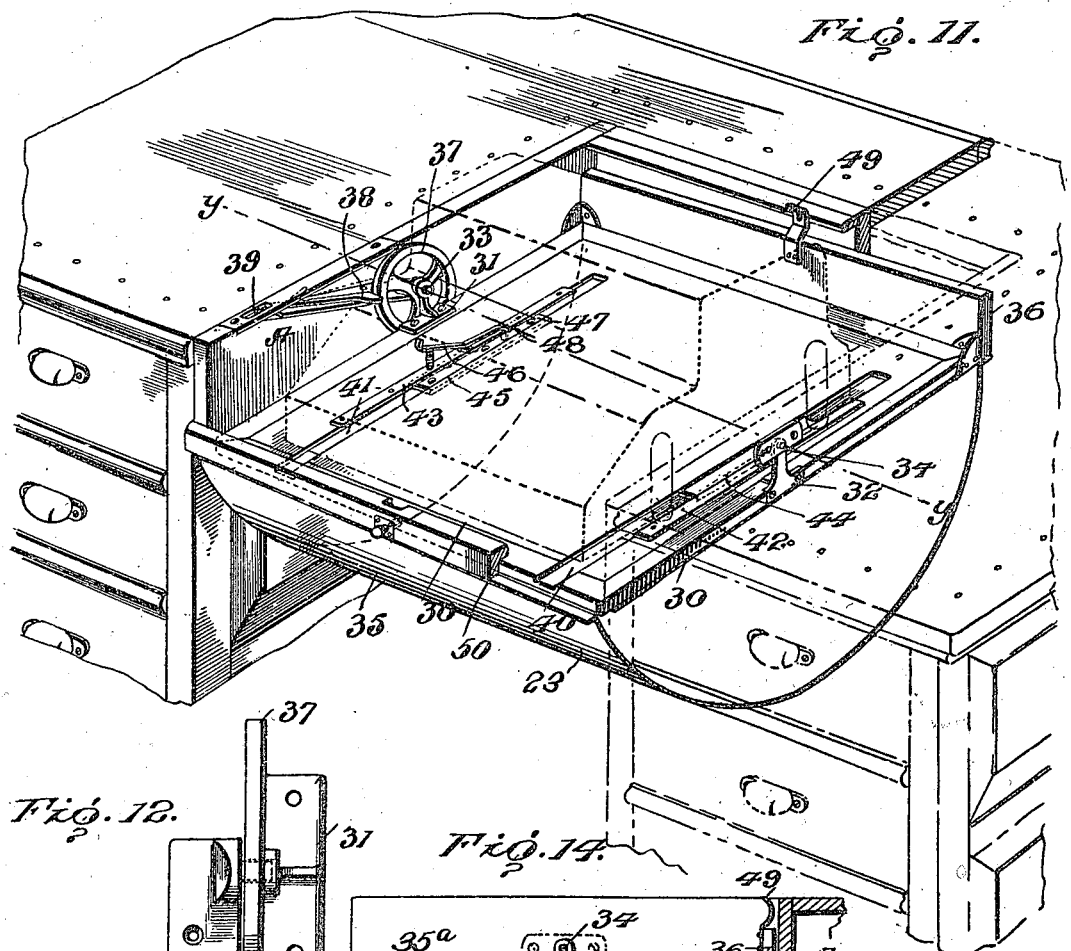

E. BALTZLEY.
TYPE WRITER CABINET.
APPLICATION FILED DEC. 18, 1906. RENEWED FEB. 19, 1910.
961,525.
Patented June 14, 1910.
6 SHEETS—SHEET 5.
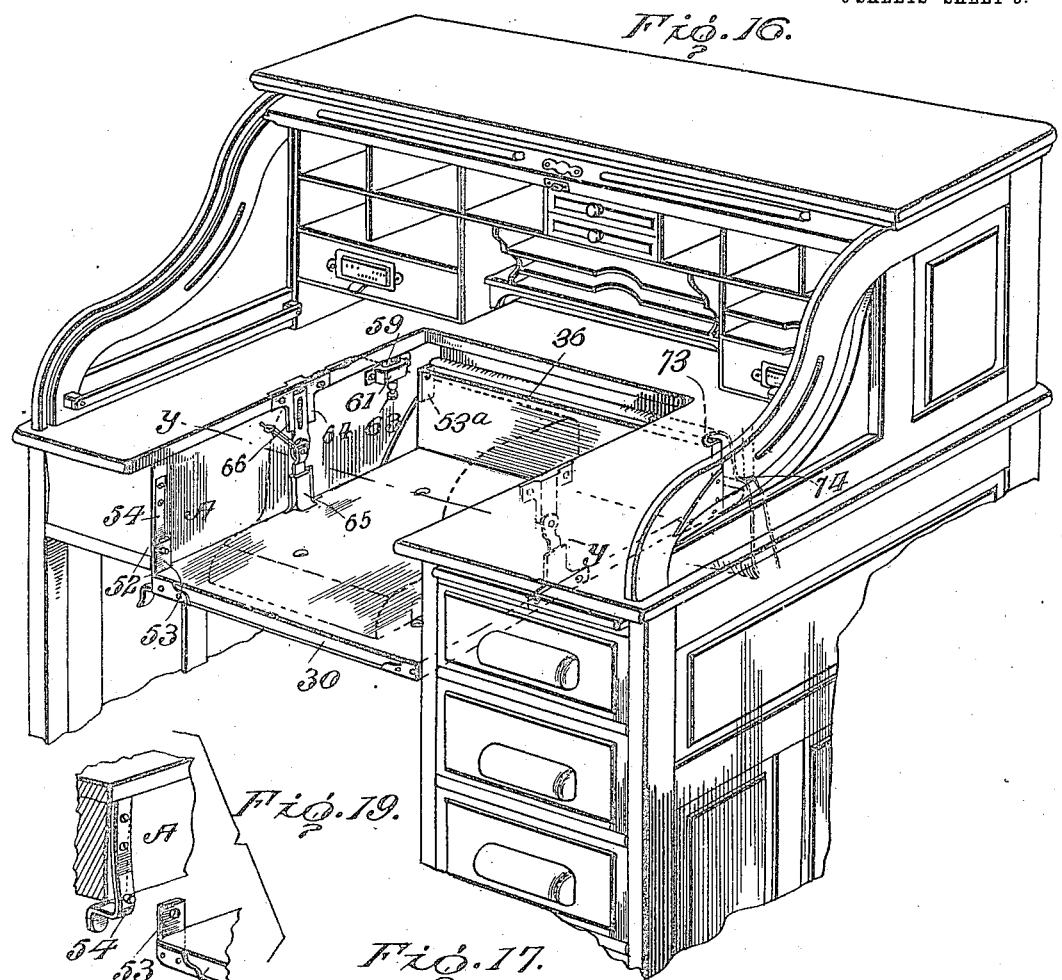
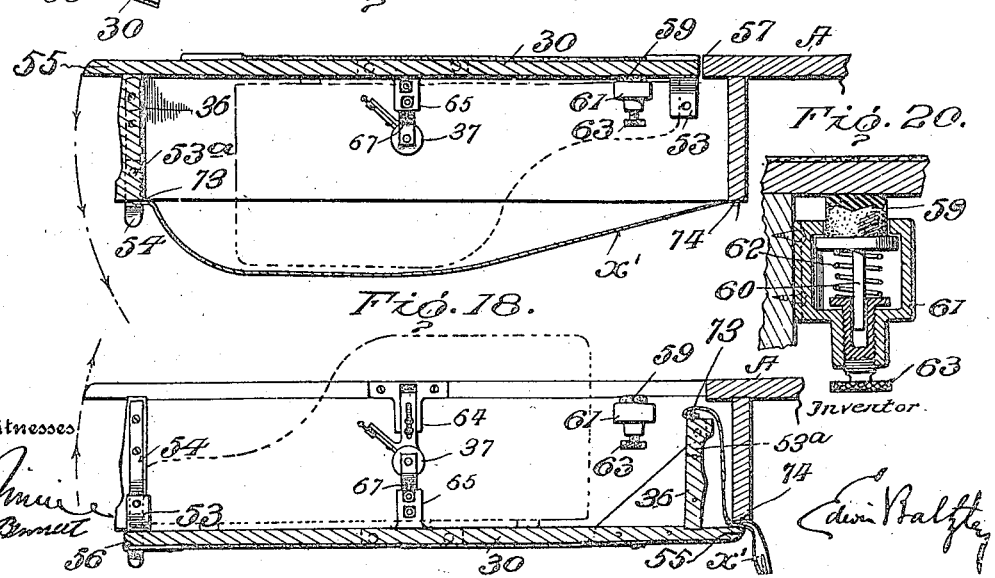

E. BALTZLEY.
TYPE WRITER CABINET.
APPLICATION FILED DEC. 18, 1906. RENEWED FEB. 19, 1910.

961,525.

Patented June 14, 1910.
6 SHEETS—SHEET 6.

UNITED STATES PATENT OFFICE.

EDWIN BALTZLEY, OF GLEN ECHO, MARYLAND, ASSIGNOR, BY MESNE ASSIGNMENTS, TO SOUTHERN FURNITURE COMPANY, OF WASHINGTON, DISTRICT OF COLUMBIA, A CORPORATION OF ARIZONA TERRITORY.

TYPE-WRITER CABINET.

961,525.  Specification of Letters Patent.  Patented June 14, 1910.

Application filed December 18, 1906, Serial No. 348,470. Renewed February 19, 1910. Serial No. 544,900.

*To all whom it may concern:*

Be it known that I, EDWIN BALTZLEY, a citizen of the United States, and resident of Glen Echo, in the county of Montgomery, State of Maryland, have invented a new and useful Improvement in Type-Writer Cabinets, of which the following is a description.

The purpose of the invention is to provide a simple, compact and easily manipulated supporting means, or device, of the disappearing type, for typewriters and other table- or desk-supported mechanisms, and which, in addition to the advantages mentioned, will require a minimum of modification or alteration of the desk or table, so that it will enable the use, for typewriters, of desks and tables of great variety of style and construction, for which purpose, in some of its forms, it may be made and sold as a complete article of manufacture fit or ready for application to desks or tables already made, and the desk or table, whatever its design may in its original construction, be equipped with my invention.

Up to the present time the disappearing devices of typewriting cabinets or tables have been constructed with and made an integral part of the cabinet or table, and are expensive, complicated and clumsy. My invention, in certain of its forms or embodiments being independent of the desk or table, is designed as such to be incorporated by the purchaser in his own desk or table. The present typewriter cabinets are not adapted to the home as an article of furniture. With my device any center table, stand, secretary or desk can be cheaply and quickly converted into a typewriter cabinet, without defacing it or interfering with its ordinary use. When not in use the machine is out of sight beneath the top of the desk or table, and the latter looks like and may be used as a simple desk or table, without regard to the presence of the machine, and it is reversible to move it into and out of position for use, on an axis or pivots on which it is hung, and it may turn or swing back and forth in its movement between its positions above and beneath the table or desk top; or it may turn or revolve in one direction through an entire circle, and when I use the term revoluble I mean it in either of the senses just explained.

For the attainment of the objects of my invention, such invention consists in the devices or mechanisms constructed substantially as hereinafter specified and claimed.

The invention also consists of a typewriter disappearing device as an article of manufacture independent of the desk or table.

It further consists of the combination of a frame and the revoluble or reversible typewriter supporting board.

It further consists of the counterbalanced typewriter supporting board.

It further consists of the counterbalanced supporting board reversible by gravity and momentum.

It further consists of other new and useful features which will be described and claimed.

Figure 22:
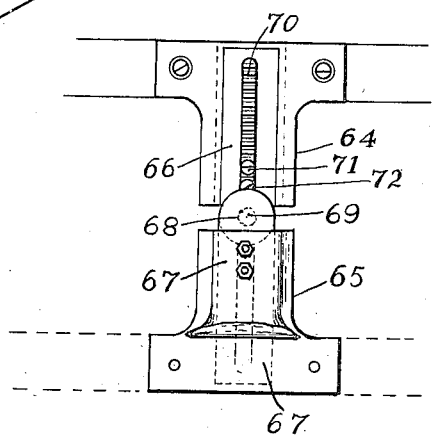

In the drawings Figure 1 is a cross section from front to back of the device showing the typewriter in position for use. It also shows in dotted lines underneath the position of the typewriter when reversed and out of use. Also, in dotted lines, a horizontal weight counterbalance inserted in a mortise in the board; also a dust shield attached to the underside of the frame. Fig. 2 is the same view as Fig. 1 except as to the counterbalance, which is here shown as a weight in the form of a box extending below the pivotal points. Fig. 3 is a top plan of the frame and its revoluble or reversible typewriter supporting board pivoted therein, showing the blotter or pad holders on its corners. The reverse side of the board is for the typewriter. Fig. 4 is a modification of the invention shown in Fig. 1, but instead of revolving from front to back, it turns from right to left or left to right, and has a longer board, pivoted at its middle, on one side of which the typewriter is attached. The counterbalance is shown in dotted lines in a mortise on the other side of the pivotal line. Figs. 5 6 and 7 are detail drawings showing a latching mechanism. Fig. 8 shows the invention attached to a flat top desk, the front part of the desk being cut away. In this form the vertically extended or box form of the counterbalanced revolving board is shown, together with a deep frame, at the bottom of which the revolving board is pivoted. Fig. 9 shows the invention incorporated in a roller top desk; the dotted lines underneath indicate the position of the typewriter when it is reversed out of sight. Fig. 10 is the invention incorporated in the door of a secretary. When the door is closed the interior of the desk or secretary serves as the dust shield. The figure also shows the typewriter in position for use when the door is open. The dotted lines underneath indicate the position of the typewriter when it is reversed in order that the door may be used as a writing table. Fig. 11 is a perspective of the invention incorporated in a desk with the front side of the frame open, and arranged to limit the revolving board to a half revolution by a cross bar at its lower front side, to which the revolving board can latch in both its open and closed positions. In this form of the invention the typewriter is reversed to operative position by raising the front side of the board and revolving it backward. In this figure part is broken away, part shown in dotted lines, and part in cross section. It also shows the pivotal hangers by means of which the typewriter is self counterbalanced by pivoting the board through the typewriter's axial center of weight, or approximately so. An auxiliary brake is also shown; also tracks on which the typewriter may be shifted from front to rear. Fig. 12 is a top plan of the auxiliary brake. Fig. 13 is a cross section of one of the tracks for shifting the typewriter. Fig. 14 is a cross section showing the relation of the supporting board to the frame when in position for work. Fig. 15 shows its relation when the device is closed. Fig. 16 is a perspective of the preferred form of the invention, incorporated in a roller top desk, in which the device is shown with its entire front open, and free from the cross bar shown in Fig. 11. In this form the device is limited to the half revolution also, but by the back part of the frame instead of the front part as shown in Figs. 11, 14 and 15. Both this construction and that of Fig. 11 admit of automatically closing and opening the device, through gravity and momentum, by simply releasing the latch. Fig. 17 is a cross section of the device when closed. Fig. 18 is a cross section of the device when open. Fig. 19 is a detail showing the latching device employed in Fig. 16. Fig. 20 is a detail of the spring and rubber cushion to soften the stroke of the revolving board in the act of automatically closing. Fig. 21 shows the adjustable hanger having the auxiliary brake as an integral part thereof. Fig. 22 is a front view of the adjustable hanger without the auxiliary brake.

In the drawings, Fig. 1, A is the frame and B the revoluble or reversible board pivoted at its middle 3 in the frame A so as to revolve therein. The typewriter 4 is shown in dotted lines in position for work. In dotted lines underneath, the typewriter 4 is shown reversed and out of use. At 5 the bolt of the locking mechanism is shown engaged with the keeper $c$ in the revolving board, the bolt part being mortised in the frame. On the opposite side of the revolving board is another keeper $c^1$ to engage the bolt 5 when the board B is reversed. The bolt 5 is slightly beveled on its upper and lower sides, as shown at 6 and 7, Fig. 7, for the purpose of readily admitting it into the socket of the keeper 8 when the board has reached its locking position. The keeper in the path of the bolt is beveled from its back to the bolt socket on both its upper and its lower sides, as shown at 9 and 10, Figs. 6 and 7, to automatically lock the revolving board in position both when it ascends and descends. If the board is not counterbalanced and by accident it is permitted to descend to the locking position with too much force, the rapidity of the descent is quicker than the spring of the bolt, and the board fails to latch in position, but passes on in its revolution till its momentum is exhausted, when it returns to its locking position, and will again pass the lock if the speed of the board is too great, and will continue to do so until the spring is quicker than the board, at which time the momentum is nearly exhausted and the board can lock without shock to the machine. The inner end of the bolt 5 is bifurcated so as to admit a spring 11 in the space made thereby. The legs 12 and 13, made by the bifurcation, are of the full thickness of the bolt from the bevel at its front end to its inner end, as shown in Fig. 7. The bifurcated end of the bolt fits neatly in a rectangular case or housing 14, and is wider than the bolt end, so as to provide shoulders 15 and 16 to abut against the bolt plate, and thereby limit the outward movement of the bolt. The inner ends of the bolt legs are rounded for the purpose of preventing the spring from catching thereon, or on any of the rough places that may be in the case 14.

In Fig. 3 I show the revolving board with blotter holders 17, 18, 19 and 20 on the four corners of its upper side, and a blotting pad held thereon by them. This constitutes the board a blotting padded writing table on its upper side, while the reverse side is a typewriter table. This enables the operator to typewrite his letter, and then by little more effort than touching the latch the board is reversed to the writing side covered by the blotting pad, whereon he may place the letter and sign it. I do not confine myself to the corner blotter holders for means to hold the blotter on the board. The blotter holders are made of metal, but they may be composed of any other suitable material, such as leather, and be fastened in place by nails or screws, or other suitable means.

In the form of the invention shown in Fig. 1 the typewriter is nearly balanced over the pivotal line, and being light requires but little weight to counterbalance the horizontal sides of the board. This additional weight for counterbalance in this form of the invention, is preferably lead inserted in a mortise, as shown at $d$. This answers for all the lighter typewriters. In the heavier ones the counterbalance is effected by placing the weight below the pivotal line or point 3, as shown in Fig. 2, by the downward box extension E. This vertical box form of the counterbalance is for the further purpose of lowering the typewriter in high desks or tables for the convenience and comfort of the operator. It is accomplished by pivoting the revolving board far enough below the desk line to bring the spacing bar on a line with the line $x\ x$, as shown in Fig. 8, and so that when the revolving board is reversed the outer face of the box E is on a line with the desk line 22, and constitutes part of the top of the desk or table. The frame A in this construction is made deep. Its upper side is attached to the desk so that its top is flush with the desk top. Within it, near its lower side, the revolving board is pivoted, so that when the writing side is revolved to the upper position its face is flush with the desk line. The front view of the construction is shown in Fig. 8, on a flat table, with the typewriter in position for work. When the typewriter is not so heavy as the one here indicated the box is not so deep, and is pivoted higher up than the one here shown at 27—28.

Although I preferably make the revolving board with a frame whereby the same may be made and sold as an independent device, it will be seen that the frame can be readily dispensed with, and the revolving board adjusted directly to the desk or table. The top of the desk would thus become the frame of the device. While this is not so complete an article of manufacture, except when made with the desk, it embraces the essential elements of the invention. When the device is made at the factory at the same time as the desk to which it is to be attached it is best to dispense with the frame other than the desk top. This saves lumber and work, requiring no more lumber than the desk without the device, and very little more work. And as the two hangers and latching device cost but a few cents, the disappearing device can be incorporated in the desk at the factory at the time of their manufacture at so little additional cost above that of the desk without the device that the desk having it can be sold at the same price as the one without it.

In Fig. 1 I show a dust shield 23 attached to the underside of the frame A. This may be of metal or any other hard substance, but I prefer to make it of a fabric, and preferably of a rubber cloth. When the disappearing device is fitted into a center table the dust shield may be of silk or any handsome drapery to correspond with the room furnishings.

In general practice I provide the metal pivotal plates 24 and 25 for the pivot and its journal box. The hanger that is made a part of these plates may be adjustable in length, as hereinafter explained.

The receptacles 26 and 26ª are for the feet of the typewriter to rest in so as to prevent it from shifting from position under any provocation.

A modification of the invention is shown in Fig. 4, in which the typewriter is located to one side of the pivotal line instead of over it. A horizontal counterbalance 21, preferably of lead, is inserted in a mortise in the board on the other side of the pivotal line. The board revolves from right to left, or left to right, instead of from front to back, and is latched in position by a mechanism similar to that shown in Fig. 1.

The usual plan of adjusting the independent device to a desk or table is to saw out a square hole in the desk or table the exact size of the frame containing the revolving board, and then nail or screw the frame to the desk in the hole thus made.

In Fig. 10 I show the invention incorporated in the door of that class of secretaries in which the door is used as the writing table when open. When the door is open the typewriter is in position for use. If it is desired to use the door as a writing table the revolving board is reversed, thus turning the typewriter underneath, as shown in dotted lines. When the door is closed with the typewriter in the upper position it is shut in the desk. The interior of the desk thus serves as the dust shield. The other form of the dust shield can also be dispensed with in roller top desks by leaving the typewriter in the upper position when the desk is closed.

For the large and heavy typewriters adequate counterbalancing is an important factor, as also is the height of the typewriter in the desk. The various means hereinbefore shown and described are for the purpose of indicating some of the methods covered by the invention. In Fig. 11 I show another form in which the typewriter is so pivoted as to nearly counterbalance itself, it being on a line approximately coincident with the typewriter's axial center of weight, in some sense as a fly wheel is balanced on its shaft, having the weight equally distributed around the shaft. In this form part of the typewriter is suspended below the pivotal line. The front of the frame is partly open, and the keyboard is on a lower level, and in most convenient position for use.

The revolving board 30 is provided with two hangers 31 and 32 attached firmly at the middle of its sides. These hangers are pivoted to the sides of the frame A at their upper ends by the pivots 33 and 34. When the typewriter is located in its proper counterbalanced position on the board 30, a line $y\ y$, drawn from 33 to 34, passes through its approximate axial center of weight. The typewriter, as here shown in dotted lines, is in position for use. The board 30 is locked to position by the latch 35 which is mortised in the cross bar 50. The bolt of the latch 35 enters the keeper 35$^a$ located in the rear side of the revolving board, as shown in Fig. 14. When the board is reversed, and the device thereby closed, the catch 49 on the other side of the board engages with the latch 35 and locks it in the closed position. When it is desired to reverse the typewriter out of use the latch 35 is released and the front side of the board is pressed down. This brings the other side up and to the front. On it is the closure piece or door 36, which drops into the front opening of the frame onto the cross bar 50 and closes it, the bolt of the latch 35 engages with the keeper 49 and the board 30 closes the top of the desk. The cross section of the frame A and the revolving board 30, shown in Fig. 14, exhibits the relation of the board to the frame when the desk is open and in position for the typewriter to be used, and the cross section, Fig. 15 shows their relation when the desk is closed.

In most typewriters the center of weight is not the center of the machine. This requires the typewriter to be located foreward or rearward of the center of the revolving board, thereby preventing perfect counterbalance at different portions of the revolution. Moreover the conformation of typewriters in general does not admit of the equal distribution of weight around a center, as in a flywheel. This defeats perfect counterbalance as seen in a fly wheel. To prevent the revolving board from being under the control of gravity at any stage of its revolution, and for the other purpose hereinafter set forth, I provide an auxiliary friction brake wheel 37 and brake 38. Friction between them will prevent the board from moving from any position without a little pressure by the hand. The brake friction may be increased or decreased by turning the screw 39.

In order to shift the typewriter back or forth on the revolving board to its desired position I provide tracks 40 and 41 with the retaining ledges 42 and 43, under which the runners or slides 44 and 45 slide back and forth. The typewriter legs are screwed to these runners as shown in the detail drawing, Fig. 13 at 51, and may be moved forward and backward and locked in position by the spring lock 46, which interlocks with the slots 47 and 48 in the runner 45.

In Fig. 16 is shown the preferred form of the invention, in which the front of the frame A is entirely open. In Fig. 11 the front of the frame is open all except the cross bar 50, while in Fig. 16 even this is eliminated, whereby all the front obstruction to the typewriter is removed. This permits the front of the revolving board to rise and move backward from its front side in the act of closing, which is the reverse of that shown in Fig. 11. It simplifies the work of incorporating the device in any desk or table, and has other advantages.

In the forms of the invention heretofore shown the aim has been to counterbalance the revolving board with the typewriter thereon as perfectly as possible at all stages of its revolution by weight, or by pivoting the typewriter on a line approximately coincident with its center of weight. In the form shown in Fig. 16 I also pivot the board with the typewriter thereon on a line approximately coincident with its axial center of weight, but so as to utilize the differential of weight to automatically operate the device by gravity and momentum, on simply releasing the latch. The differential of weight to accomplish this is slight, and hence the typewriter must be nearly counterbalanced on the board.

In Fig. 16 the device is shown open and the typewriter in operative position. The revolving board 30 is locked to the frame A by the latch 52, which is composed of the keeper 53 on the board 30, and the spring bolt 54, Fig. 19, attached to the frame A. The board is pivoted in the frame A the same as that shown in Fig. 11. It is limited to a half revolution when open by its front end 55 in contact with the underside of the back part of the frame A, as shown in Fig. 18. The typewriter is located on the board so that its axial center of weight is slightly in the rear of the pivotal line when the device is open, as shown in Figs. 16 and 18. When the latch 52 is released the rear side of the board, indicated by 55, drops by gravity, bringing the other side 56 up and back to the rear at 57, as shown in Fig. 17, thereby closing the device. In this position it is latched by the bolt 54 entering the keeper 53$^a$. When the center of weight passes the pivotal line the board in its flight would stop but for momentum, which carries it forward to the latching position. It is thereby reversed and locked in its closed position. To reverse it again from its closed to its open position it is only necessary to release the latch again. The center of weight being now slightly to the front of the pivotal line, the front side of the board drops and is carried down and back by gravity and momentum to its underside position at 55, Fig. 18. In this position it is latched by the spring bolt 54 in the keeper 53. It is, however, necessary to assist it to latch in this position by a little hand pressure.

I provide a combination spring and rubber cushion, or tension, Fig. 20 to soften the stroke of the board in coming to its closed position. This cushion is fastened to the frame A, and is composed of a rubber cushion 59 on the end of a tension rod 60, mounted in a casing 61, which is attached to the frame A. Around the tension rod 60 is a tension spring 62, which rests on a tension screw 63. By turning the screw 63 the tension cushion can be regulated to the force of the stroke of the board in closing to the latch.

The size and conformation of some typewriters make it desirable to locate the typewriter on the board so as to give the gravity drop of the revolving board too much force. In these cases I employ the auxiliary brake 37—38, shown in Fig. 11, by which the force of the stroke can be perfectly regulated to any typewriter.

Adjustment of the revolving board with the typewriter thereon to the approximate axial center of weight of any typewriter is partially effected by the position of the typewriter on the board, and partly by raising or lowering the board with reference to the pivotal points. The latter is accomplished by an adjustable hanger, as more clearly shown in Fig. 21, which is composed of four parts, the two brackets 64 and 65 and the two sliding pieces 66 and 67. The bracket 64 is rigidly attached to the frame A at its top, or to the desk as shown in Figs. 16 and 21, and the bracket 65 is attached to the middle of the revolving board. The sliding piece 66 has a pivot hole 68 in its lower end, and the sliding piece 67 has a pivot hole 68 in its upper end, in which holes are placed a pivot pin 69. The sliding piece 66 has a long slot 70 through which the bolts 71 and 72 pass and fasten to the bracket to bind the sliding piece thereto. The sliding piece may be raised or lowered to any desired position on the bracket. The bracket 65 and its sliding piece are similarly arranged, so that the revolving board can be raised or lowered with reference to the pivotal points and the top of the desk. The contact faces of the four pieces are toothed or serrated, as shown, to prevent them from slipping when clamped together by the bolts.

In Figs. 17 and 18 the preferred form of the dust shield is shown, which consists of a rubber cloth $x'$, one end of which is attached to the front side of the revolving board at 73, Fig. 17, and the other end to the rear side of the frame A at 74. In this shielding position it is stretched taut, as shown in Fig. 17. When the board is reversed to the open position the cloth dust shield assumes the position shown in Fig. 18. By this arrangement it is automatically adjusted to and removed from its shielding position by simply reversing the revolving board.

The other constructions herein shown and described to illustrate the generic principle of the invention, but not claimed, will be the subject of separate applications for patent.

What I claim is:

1. The combination of a desk or table for a typewriting machine, means for holding the machine in each of two positions, one for use and one out of use, means for rotatably supporting said machine, so that it may be moved from one of such positions to the other, the parts being so constructed and arranged that the machine when free to turn will automatically turn from one of said positions to and remain in the other.

2. The combination of a desk or table for a typewriting machine, means for pivotally supporting a machine so that it may be moved from a position at the top of the desk to one beneath the same, said machine normally tending to turn on its pivotal support from one position to the other, means to arrest its movement when it reaches said other position, and a movable holding device to prevent said normal tendency of the machine.

3. The combination of a desk or table for a typewriting machine, a pivoted invertible board, means for attaching a machine to said board, said board in one position being above the machine, and in the other position below the machine, and machine and board normally tending to turn from one of said positions to the other, means to arrest such turning movement when such other position is reached, and a latch to prevent said normal tendency.

4. The combination of a desk or table, a pivoted support for rotatably and reversibly supporting a typewriting machine, counterbalancing means, the parts being so constructed and arranged that the machine when free to turn, will automatically turn from one of its reversed positions to the other and remain in such other position, and means for holding the machine in the position from which it automatically turns.

5. The combination of a desk or table, means for rotatably and reversibly mounting a machine, whereby it may be shifted from a position at the top of the desk to one beneath the same, and means for controlling its speed of movement while passing from one position to the other.

6. A typewriter disappearing attachment for desks or tables, comprising a frame adapted to be applied to the latter, and means for rotatably mounting a typewriter in such frame, said attachment being an article of manufacture apart from the desk or table.

7. The combination of a desk or table having an opening in its top, a frame fitting such opening and secured therein, and a typewriter supporting board pivotally mounted in said frame.

In testimony whereof I have signed my name to this specification in the presence of two subscribing witnesses.

EDWIN BALTZLEY.

Witnesses:
W. N. WOODSON,
JNO. IMIRIE.